PUSH-PULL CONTROL FOR CONSTANT SPEED MOTOR
Filed July 30, 1959
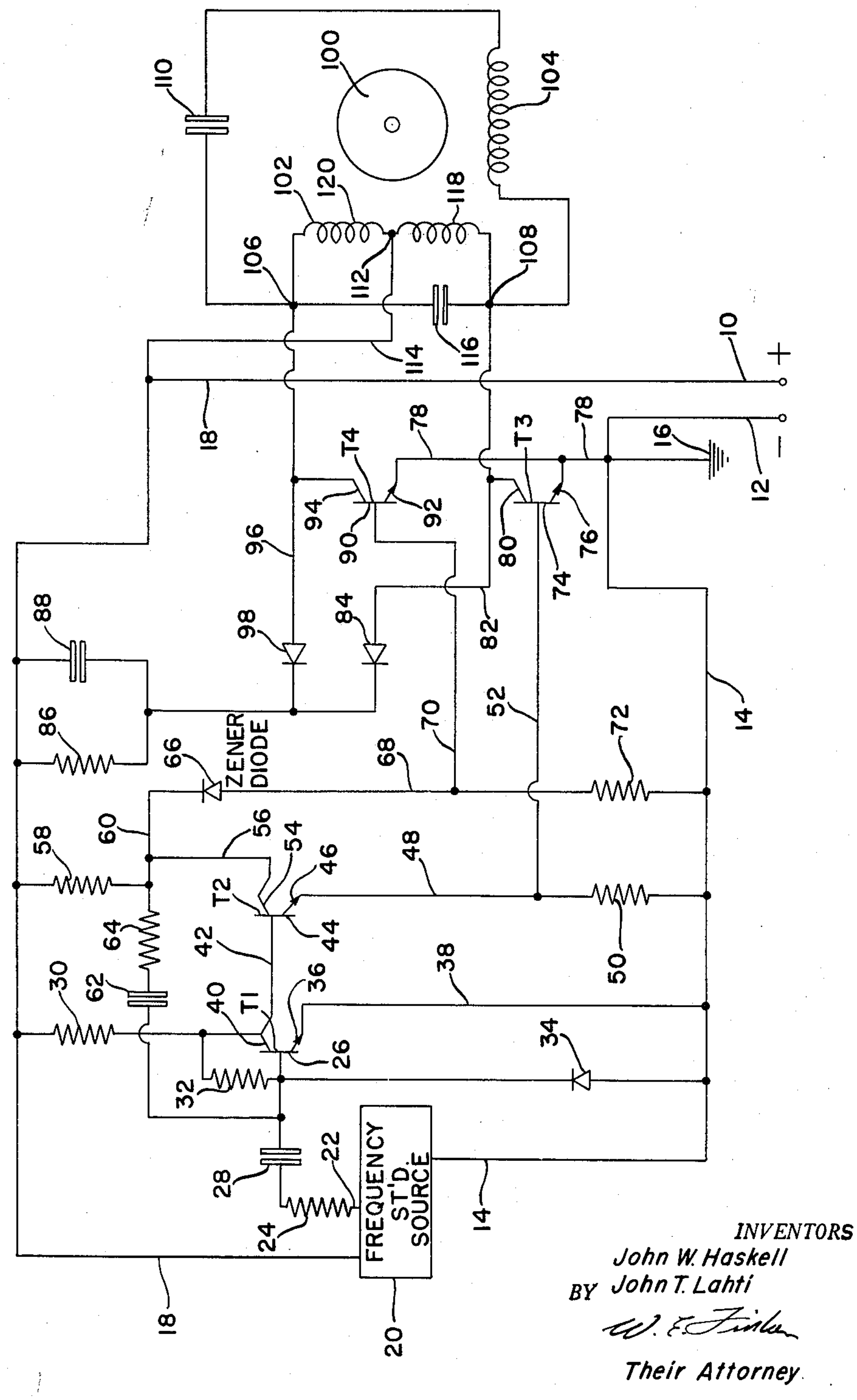
INVENTORS
John W. Haskell
BY John T. Lahti
W. E. Finken
Their Attorney United States Patent Office 3,121,832
Patented Feb. 18, 1964

3,121,832

PUSH-PULL CONTROL FOR CONSTANT SPEED MOTOR

John W. Haskell, Rochester, and John T. Lahti, East Rochester, N.Y., assignors to General Motors Corporation, Detroit, Mich., a corporation of Delaware Filed July 30, 1959, Ser. No. 830,513
2 Claims. (Cl. 318—138)

This invention pertains to a constant speed prime mover, and particularly to a circuit arrangement energized from a source of direct current for operating a synchronous motor at constant speed.

Heretofore, prime movers which operate at a substantially constant speed and are energized from a source of direct current power have been manufactured. A prime mover of this type comprising a governor controlled commutator motor is disclosed in Sullivan et al. Patent 2,478,848. However, since it is well recognized that a centrifugal governor is a speed error actuated device, it is apparent that precise speed regulation cannot be obtained with a governor controlled commutator motor. The present invention relates to a power amplifier embodying a frequency standard source and having a push-pull output signal for energizing a hysteresis type synchronous motor. Since the speed of a synchronous motor is determined by the frequency of the energizing source, it will be appreciated that if the frequency is constant, the speed of rotation of the synchronous motor will be constant.

Accordingly, among our objects are the provision of a constant frequency power amplifier having a single-ended input signal and a push-pull output signal; the further provision of a power amplifier of the aforesaid type having a phase splitting circuit including a Zener diode; and the still further provision of a constant speed device having a constant frequency power amplifier and a prime mover of the synchronous motor type wherein one of the motor windings is used as the output transformer of the amplifier.

The aforementioned and other objects are accomplished in the present invention by connecting one winding of the synchronous motor as an auto transformer which is energized from the push-pull output stage of the amplifier. Specifically, the amplifier is energized from a source of direct current potential and includes a frequency standard source. Frequency standard sources are commercially available and are well known in the art, and comprise a tuning fork which is calibrated to vibrate at a predetermined frequency in the audio range, for instance, 360 cycles per second. The tuning fork is vibrated by suitable drive coils energized from the source of direct current and produces a single ended square wave output signal having a constant frequency. The constant frequency signal produced by the frequency standard source is coupled to a first stage amplifier, the output of which is coupled to a driver stage transistor amplifier.

The driver transistor is connected in a phase splitting circuit including a current limiting resistor, a Zener diode and two push-pull output transistors. When the driver transistor is saturated by the positive half cycle of the square wave input from the first stage amplifier, current flows from the source through the current limiting resistor, through the collector emitter path of the driver transistor into the base of one of the push-pull output transistors. The breakdown voltage of the Zener diode is selected to exceed the collector voltage of the driver transistor when it is saturated and thus prevents base current flow to the second push-pull output transistor. When the driver transistor is cut off by the negative half cycle of the square wave input, the base current to the one push-pull output transistor is likewise cut off and diverted to the base of the other push-pull output transistor through the Zener diode, since the Zener diode breaks down and conducts current when the voltage on the collector of the driver transistor rises. In effect, the push-pull output transistors are operated as switches which are alternately closed so as to produce a double ended, or push-pull, output signal.

The prime mover comprises a hysteresis type synchronous motor having a pair of field windings. The field windings are interconnected through a condenser so as to obtain a phase difference in the signals in the two windings. The main winding is center tapped and connected as an auto transformer with the push-pull output stage transistors. This arrangement eliminates the need for an output transformer thereby resulting in a substantial cost and space savings. When the amplifier is energized, the synchronous motor will rotate at a speed proportional to the frequency standard source.

Further objects and advantages of the present invention will be apparent from the following description, reference being had to the accompanying drawing, wherein a preferred form of the present invention is clearly shown.

In the drawing:

The drawing is a schematic circuit diagram of a constant speed device constructed in accordance with the present invention.

With particular reference to the drawing, numerals 10 and 12 depict positive and negative terminals, respectively, of a direct current power source, which may be on the order of 28 volts. The negative terminal 12 is connected to a wire 14, which is connected to ground, as indicated by numeral 16. The positive terminal 10 is connected to a wire 18. A frequency standard source is schematically indicated by numeral 20, the frequency standard source having input terminals connected between the wires 14 and 18. The frequency standard source 20 is energized from the direct current power source and operates to produce a single-ended square wave output signal of constant frequency between output terminals 18 and 22.

Output terminal 22 of the frequency standard source 20 is connected to the base electrode 26 of an input stage transistor T1 of the NPN type through an isolating resistor 24 and a condenser 28. The base 26 of the transistor T1 has a base current bias derived from a resistor network including resistors 30 and 32 connected between wire 18 and the base electrode 26. A clamping diode 34 is connected between the base 26 and the emitter 36 of transistor T1 in the proper source to prevent the base from being driven negative with respect to the emitter. The base 26 is connected to the junction between resistor 32 and the clamping diode 34.

The emitter electrode 36 and the transistor T1 is connected by wire 38 to the negative terminal of the power supply through wire 14. The collector electrode 40 of the transistor T1 is connected to wire 18 through the resistor 30. The single-ended constant frequency square wave signal applied to the base electrode of the transistor T1 is amplified and applied from the collector electrode 40 by means of a wire 42 to the base electrode 44 of a driver stage transistor T2. The driver transistor T2 is likewise of the NPN type indicating an emitter electrode 46 connected to a wire 48. Wire 48 connects with one end of a resistor 50 and a wire 52. The other end of the resistor 50 is connected to the negative terminal of the power supply through wire 14. The collector emitter electrode 54 of the transistor T2 is connected to a wire 56 which connects with one end of a resistor 58 and a wire 60. The other end of the resistor 58 is connected to the wire 18, the resistor 58 functioning as a current limiter. The base 26 of the transistor T1 is interconnected with the collector electrode 54 of the transistor T2 through a positive feedback circuit including a condenser 62 and a resistor 64.

A Zener diode 66 is connected between the wire 60 and a wire 68. The wire 68 connects with a wire 70 and with one end of a resistor 72, the other end of which is connected to wire 14. The Zener diode 66 constitutes a component of a phase splitting circuit for producing a push-pull output from the single-ended output signal of the driver stage transistor T2. Wire 52 is connected to the base electrode 74 of a lower output transistor T3 of the NPN type. The emitter electrode 76 of the transistor T3 is connected by wire 78 to the wire 14. The collector electrode 80 of the transistor T3 is connected to a wire 82, one end of which is connected through a conventional diode, or rectifier, 84 to the positive wire 18 through a resistor 86 which is shunted by a filter condenser 88.

The wire 70 is connected to the base electrode 90 of an upper push-pull transistor T4 of the NPN type. The emitter electrode 92 of the transistor T4 is connected to wire 78, and the collector 94 is connected to a wire 96. One end of the wire 96 is connected through a conventional diode, or rectifier, 98, to the resistor 86 and the filter condenser 88. The rectifiers 84 and 98 combined with resistor 86 and condenser 88 function as a voltage peak suppressor.

When the frequency standard source 20 is energized, the single-ended square wave output thereof is applied to the base 26 of transistor T1, and the amplified output of transistor T1 from the collector electrode 40 is applied to the base 44 of the driver transistor T2. When the transistor T2 is saturated by the positive half cycle of the square wave signal from the input transistor T1, current flows from wire 18 through the resistor 58, the wire 56, through the collector-emitter path of the transistor T2 through the wire 48 and the wire 52 into the base 74 of the lower push-pull transistor T3. The break-down voltage of the Zener diode 66 is selected to exceed the voltage on the collector-emitter 54 of the transistor T3 in the saturated condition so as to prevent base current flow to the upper transistor T4. Therefore, during the positive half cycle of the input to the drive transistor 72, the transistor T3 will be conductive, and current will flow from the wire 18 through the lower half, 118, of the main motor winding 102 and through the collector-emitter path of transistor T3.

On the negative half cycle of the square wave input signal to the transistor T2, the transistor T2 is cut off, or rendered nonconductive. Accordingly, the base current to the lower output transistor T3 is likewise cut off. However, when the driver transistor T2 is cut off the potential appearing at the collector 54 of the transistor T2 and the wire 60 rises, and the base current flow through the transistor T4 breaks down the Zener diode so that the transistor T4 is rendered conductive. When the transistor T4 is supplied with base current flow, the current flows from wire 18 through the upper half, 120 of the main motor winding 102 and the collector-emitter path of transistor T4. Thus, the delivery of base current alternately to the transistors T3 and T4 results in a push-pull output signal between wires 82 and 96.

The push-pull output signal of constant frequency as determined by the frequency standard source 20 is used to control the energization of a hysteresis type synchronous motor having a rotor 100 and a stator with main field winding 102 and an auxiliary phase winding 104. The main winding 102 has end terminals 106 and 108 and is connected to the phase winding 104 through a phase shifting condenser 110. Accordingly, the auxiliary phase winding 104 is energized across the terminals of the main winding 102, and the phase shifted signal of the winding 104 will assure that the motor will be self-starting and will always rotate in the same direction.

One of the unique features of the constant speed device involves the elimination of a conventional output transformer between the push-pull transistors T3 and T4 and the main winding 102 of the motor. To accomplish this result the main winding 102 is center tapped as indicated by numeral 112, the center tap being connected to a wire 114. The wire 114 is connected to the wire 18 and the positive terminal of the direct current supply. The push-pull transistors T3 and T4 operate as switches in the energizing circuit for the motor. By center tapping the main winding 102 the auto transformer operation is achieved. A condenser 116 is connected between the terminals 108 and 106 of the main winding 102, the condenser functioning to improve the power factor by bringing it closer to unity and also to improve the shape of the wave produced by the push-pull transistors T3 and T4. The synchronous motor will run at a speed determined by the frequency of the input signal developed by the frequency standard source, and since this frequency is constant, the synchronous motor will run at a constant speed.

When the transistor T3 is conductive, current will flow from the positive terminal 10 through wire 18, wire 114 through the lower half 118 of the main winding 102 and then to terminal 108 and wire 82 through the collector-emitter path of transistor T3 and wires 78 and 14 to the negative terminal 12 of the power supply. The voltage impressed on the lower half 118 of the main winding 102 will be doubled by transformer action across the entire winding including the lower half 118 and the upper half 120, and this voltage will likewise appear in quadrature across the phase winding 104. When the transistor T4 is conductive and the transistor T3 is nonconductive, current will flow from the positive terminal 10 through wire 18 and wire 114 through the upper half 120 of the main winding 102 and then from terminal 108 and wire 96 through the collector-emitter path of the transistor T4 and wires 78 and 14 to the negative terminal 12. The voltage appearing across the upper half 20 will likewise be doubled by auto transformer action and appear across the entire winding 102, and in quadrature across the phase winding 104.

While the embodiment of the invention as herein disclosed constitutes a preferred form, it is to be understood that other forms might be adopted.

What is claimed is as follows:

1. A constant speed device including, a direct current power supply, a frequency standard source energized from said power supply and having a constant frequency single-ended output signal, a first amplifier stage including an output transistor having an input signal comprising said single-ended signal, a push-pull amplifier stage connected to the output of said first amplifier stage, means coupling said first amplifier stage and said push-pull amplifier stage including a Zener diode connected in the collector circuit of said output transistor and having a breakdown voltage exceeding the output voltage of said first amplifier stage when it is conductive, and a synchronous motor having a field winding energized by the output of said push-pull amplifier stage so as to be energized for constant speed rotation.

2. A constant speed device including, a direct current power supply, a frequency standard source energized from said power supply and having a constant frequency single-ended output signal, a first amplifier stage including an output transistor having an input signal comprising said single-ended signal, a push-pull amplifier stage connected to the output of said first amplifier stage, means coupling said first amplifier stage and said push-pull amplifier stage including a Zener diode connected in the collector circuit of said output transistor and having a breakdown voltage exceeding the output voltage of said first amplifier stage when it is conductive, a synchronous motor having a center tapped field winding, and means impressing the push-pull output signal on alternate halves of said field winding whereby the auto transformer action of said field winding will be sufficient to energize said motor for constant speed rotation.

References Cited in the file of this patent

UNITED STATES PATENTS

| | | |
|---|---|---|
| 2,257,158 | Cooley | Sept. 30, 1941 |
| 2,786,972 | Drier et al. | Mar. 26, 1957 |
| 2,794,076 | Shea | May 28, 1957 |
| 2,814,769 | Williams | Nov. 26, 1957 |
| 2,832,846 | Waldhauer | Apr. 29, 1958 |
| 2,864,983 | Crafts et al. | Dec. 16, 1958 |
| 2,995,690 | Lemon | Aug. 8, 1961 |
| 3,083,326 | Deming | Mar. 26, 1963 |